United States Patent [19]

Dudley et al.

[11] 4,137,176

[45] Jan. 30, 1979

[54] CHIP DISCHARGE FOR CONTINUOUS CHIP WRINGER

[75] Inventors: Robert H. Dudley, Portage; Larry D. Areaux, Texas Township, Kalamazoo County, both of Mich.

[73] Assignee: Reclamet, Inc., Kalamazoo, Mich.

[21] Appl. No.: 840,954

[22] Filed: Oct. 11, 1977

[51] Int. Cl.² ............................................. B01D 33/10
[52] U.S. Cl. .................................................. 210/375
[58] Field of Search .................. 210/360 R, 365, 369, 210/372, 373–375, 377, 379, 380 R, 380 H; 233/1 E, 3, 46, 47 R

[56] References Cited

U.S. PATENT DOCUMENTS

| | | | |
|---|---|---|---|
| 2,575,691 | 11/1951 | Smith | 210/360 R |
| 3,012,710 | 12/1961 | Steinacker | 233/1 E |
| 3,233,735 | 2/1966 | Hultsch et al. | 210/380 |
| 3,338,417 | 8/1967 | Heckmann et al. | 210/380 |
| 3,366,318 | 1/1968 | Steimel | 233/24 |
| 3,519,136 | 7/1970 | Lela et al. | 210/374 |
| 3,850,814 | 11/1974 | Dudley | 210/304 |

FOREIGN PATENT DOCUMENTS 955940  7/1949  Fed. Rep. of Germany ........... 210/374

*Primary Examiner*—William A. Cuchlinski, Jr.
*Assistant Examiner*—Jon E. Hokanson
*Attorney, Agent, or Firm*—Blanchard, Flynn, Thiel, Boutell & Tanis

[57] ABSTRACT

A centrifuge for continuously separating a lubricating liquid from lubrication-impregnated metal chips. A motor having a drive shaft thereon is mounted so that the drive shaft is drivingly coupled to a substantially bell-shaped centrifugal drum having an outwardly widening conical portion. The drum is formed with openings intermediate the top edge and bottom wall for discharge of the liquid therethrough. A metal chip and air inlet is provided adjacent the central portion of the outwardly opening drum. A first collecting structure is provided for collecting the liquid emanating from the lubrication-impregnated chips and for discharging the liquid from the centrifuge. A second annular collecting structure surrounds the peripheral edge of the drum radially outwardly spaced therefrom for collecting shavings discharged by centrifugal action from the drum. An outlet duct is connected to the second collecting structure and has a central axis extending tangential to the second collecting structure and away therefrom and defining a metal chip and air outlet. A plurality of blades may be mounted on the drum adjacent the top edge and are movable therewith for effecting a movement of air into the second annular collecting structure from the air inlet and out through the outlet duct to effect an entrainment of the metal chips in the air movement for discharge out through the outlet duct.

7 Claims, 5 Drawing Figures

CHIP DISCHARGE FOR CONTINUOUS CHIP WRINGER

FIELD OF THE INVENTION

This invention relates to a centrifuge and, more particularly, to a centrifuge for continuously separating a lubricating liquid from lubrication-impregnated metal chips and including air moving structure for effecting an air movement to entrain liquid-free metal chips therein for conveyance to a remote location.

BACKGROUND OF THE INVENTION

Centrifuges for continuously feeding and removing liquid from lubrication-impregnated metal chips or shavings are well known in the art and the teachings in Steimel U.S. Pat. No. 3,366,318 and Dudley U.S. Pat. No. 3,850,814 are representative teachings of such structures. However, the movement of lubrication-free shavings from the discharge at the centrifuge to a distant location is a very slow and cumbersome process usually utilizing energy consuming and high maintenance conveyors or the like to effect such movement. Accordingly, it is desirable to lower the maintenance requirements and to improve the efficiency of movement of lubrication-free shavings, namely metal chips or the like, from the centrifuge to distant locations without necessitating the consumption of additional energy to effect such movement.

It is an object of this invention to use the energy possessed by the chips as they leave the drum to effect a conveyance of the chips to a distant location.

It is a further object of this invention to provide structure on the centrifugal drum, which is rotated at a high velocity to effect the removal of lubricant from the lubrication-impregnated shavings so that a usage of the high velocity of the centrifugal drum will effect the generation of a stream of air in which the shavings are entrained and cause a movement of the shavings to the distant location without necessitating the provision of additional energy consuming devices.

It is a further object of the present invention to specifically provide air moving blades on the centrifugal drum to effect an air movement within the chamber normally provided for collecting metal chips so that the metal chips will become entrained in such air movement and driven out through an outlet duct to a distant location.

SUMMARY OF THE INVENTION

In general, the objects and purposes of the invention are met by providing a motor having a drive shaft drivingly connected to a centrifugal drum. The drum is formed to have openings to facilitate the discharge of liquid therethrough under the action of centrifugal force. Collecting structure is provided for collecting the liquid emanating from the lubrication-impregnated shavings and for discharging the liquid from the centrifuge. A second annular collecting structure is provided for surrounding the shaving dispensing edge of the drum and is spaced radially outwardly therefrom for collecting shavings discharged by centrifugal action from the drum. An outlet duct is connected to the annular collecting structure and has a central axis extending tangential to the annular collecting structure and away therefrom and defining an air outlet. A plurality of blade means may be mounted on the drum and movable therewith for effecting a movement of air into the annular collecting structure through an air inlet and out through the outlet duct to effect an entrainment of the shavings in the air movement for discharge out through the outlet duct.

BRIEF DESCRIPTION OF THE DRAWINGS

Further objects and purposes of this invention will be apparent to persons acquainted with apparatus of this general type upon reading the following specification and inspecting the accompanying drawings, in which.

Figure 1:
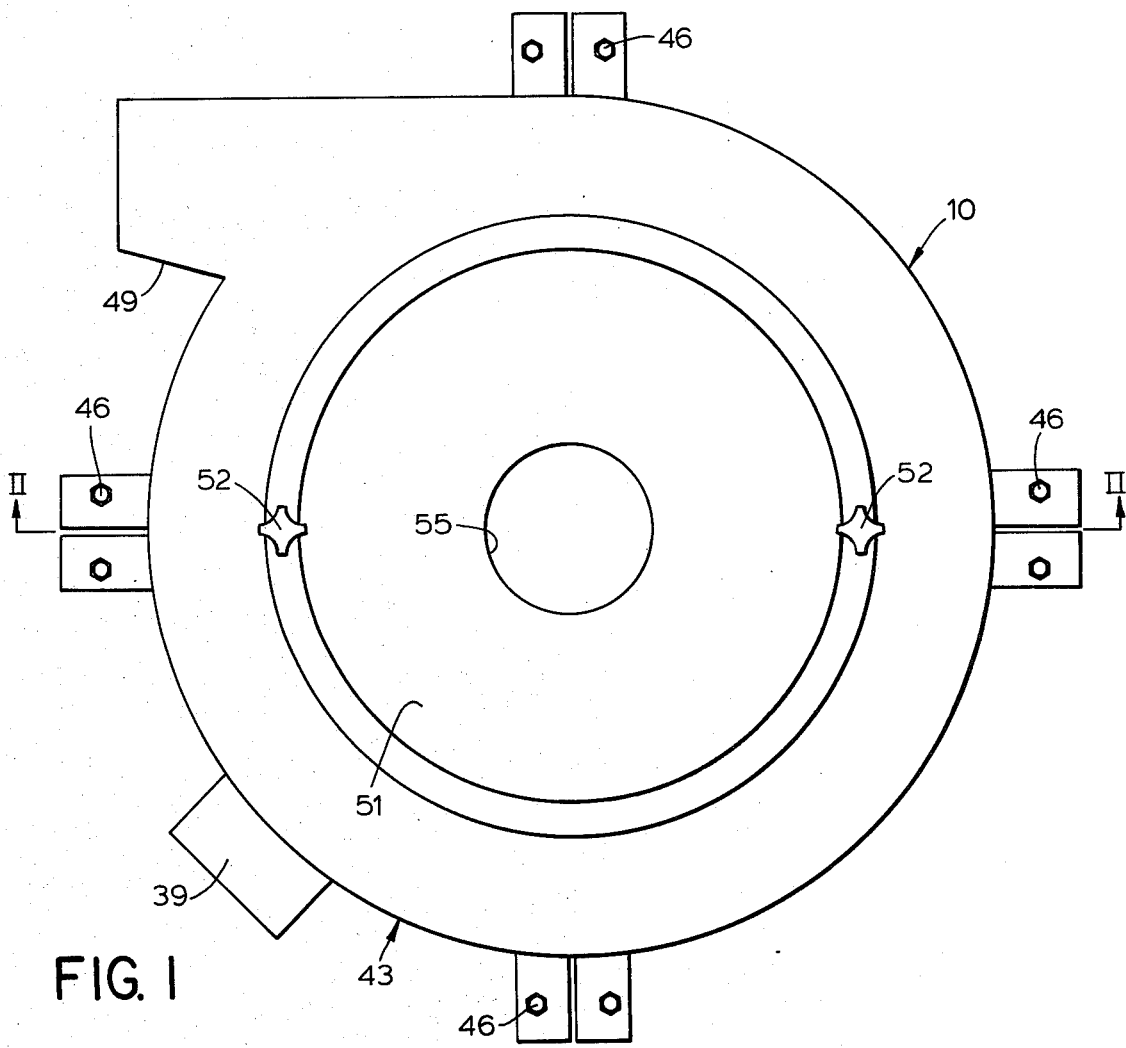
FIG. 1 is a top view of a centrifuge embodying the invention.

Certain terminology will be used in the following description for convenience in reference only and will not be limiting. The words "up" and "down" will designate directions in the drawings to which reference is made. The words "in" and "out" will refer to directions toward and away from, respectively, the geometric center of the device and designated parts thereof. The aforementioned terminology will also include derivatives thereof and words of similar import.

DETAILED DESCRIPTION

Referring now to the drawings, it will be seen that the centrifuge 10 according to the present invention comprises a motor 12 having a substantially vertical drive shaft 11 to the upper end of which a substantially bell-shaped centrifugal drum 13 is connected for rotation with the drive shaft. Elastic mounting means are provided for mounting the motor with the drive shaft extending in substantially vertical direction and permitting the motor to vibrate transverse to its axis. The elastic mounting means may include a flange 14 secured to the lower end of the motor 12, a second flange 15 abutting against the flange 14 coaxially arranged with respect thereto and fixed thereto in any convenient manner and carrying fixably connected thereto a downwardly projecting central stud shaft 16 surrounded by a plurality of rubber rings 17 which are housed in a socket mounted in the base 18 of the centrifuge 10. The rubber rings 17 can be compressed by means of a clamping flange 19 screwed into the upper end of the socket in which the rubber rings are housed.

The end of the drive shaft 11 projecting upwardly beyond the motor 12 is preferably keyed. An internally keyed recess 21 is located in a central cavity in the bottom wall 22 of the drum 13 and receives the keyed shaft 11 so as to effect a driving coupling between the shaft 11 and the drum 13. In this particular embodiment, the central cavity in the bottom wall 22 of the drum 13 is defined by a separate hub member 23. A key 26 is received in the keyway and cooperates with the corresponding keyed recess 21 in the hub 23 to effect the unitary drive between the drive shaft 11 and the drum 13. The bottom wall of the drum extends outwardly and upwardly to form an upwardly opening conical surface 27. A flange 28 extends radially outwardly of the upper edge of the conical surface 27. A liner 13A is mounted in the drum 13 and is removably secured by bolts 24 to the bottom wall thereof. The liner 13A has a shape identical to the internal contour of the drum 13. A substantially cylindrical and porous drum portion 29 defined by a wire mesh or the like, namely a portion having openings therein to permit passage of lubricant therethrough without permitting passage of shavings, extends upwardly from the flange 28 to permit a discharge of the lubricating liquid to be separated from the metal shavings in the drum from the interior of the latter. The porous cylindrical portion 29 is secured to the flange 28 by means of a plurality of fasteners 31. A conical portion 32 is secured to the upper edge of the porous portion 29 and extends radially outwardly in an upward direction to a shaving dispensing edge 33 thereon. A radially extending flange 34 is secured to the centrifugal drum 13 intermediate the juncture between the conical portion 32 and the porous cylindrical portion 29 and extends radially outwardly therefrom. The purpose of this flange will be explained hereinbelow.

The liquid discharged through the openings in the porous drum portion 29 will be collected in a collection chamber 36, preferably constituted by a casing wall 37 surrounding the drum outwardly spaced therefrom and provided with a bottom 38 which is slightly inclined toward a discharge conduit 39 communicating with the interior of the chamber 36. An annular flange 42 is secured to and extends radially outwardly from the conical portion 27 of the drum 13 at a location thereon immediately above the upper edge of the cylindrical portion 41 to define a labyrinth type seal 40 to prevent the movement of particles and/or lubricant into the interior of the cylindrical portion 41 adjacent the motor 12.

A cover 43 is fixed in any convenient manner to the upper edge of the casing wall 37. In this particular embodiment, the upper edge of the casing wall 37 has a radially outwardly extending flange 44 thereon having a plurality of holes therein receiving fasteners 46 cooperating with aligned holes in the cover 43 to effect the securement of the cover 43 to the casing 37. The cover 43 is designed so as to be interchangeable with existing centrifuge structures. The cover has a downwardly extending wall cylindrical wall 47 telescoped inside the upper edge portion of the casing 37. A radially inwardly directed flange 48 is secured to the cylindrical wall member 47 and is positioned so as to be located immediately above the radially outwardly extending flange 34 secured to the drum 13 at the juncture between the porous drum portion 29 and the conical portion 32. The spacing between the flanges 34 and 48 define a labyrinth type seal 50 to prevent the movement of chips into the chamber 36. The radially inner edge of the flange 48 is spaced radially outwardly from the conical portion 32 of the drum 13 to facilitate an oscillatory movement of the drum 13 should it become lopsided in its loaded condition. As illustrated in FIG. 1, the cover 43 is generally circular in construction and has an outlet duct integrally formed therewith. In the particular embodiment, the cover 43 has an upper conical member 51 releasably secured thereto by a plurality of fasteners 52 so that the wall of the cone 51 defines the inner wall of a second annular shaving collecting chamber 53 and the cylindrical wall 47 defines the outer wall thereof. The upper cone 51 converges in a downwardly direction to a location spaced immediately above the plane defined by the radial flange 28 at the upper end of the conical portion 27 of the drum 13. The opening 55 at the lower end of the upper cone 51 defines an air inlet as well as an inlet for shavings into the centrifuge 10.

Figure 3:
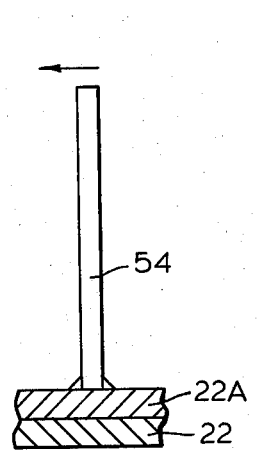
FIG. 3 is a sectional view taken along the lines III—III of FIG. 2.

A plurality of blade members 54 are secured as by welding to the bottom wall 22A as well as to the conical portion 27A of the liner 13A. The blade members 54 are radially oriented with respect to the drum 13. An enlarged detail of the blade construction is illustrated in FIG. 3.

Figure 4:
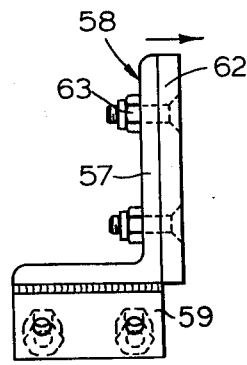
FIG. 4 is a sectional view taken along the line IV—IV of FIG. 2.
Figure 2:
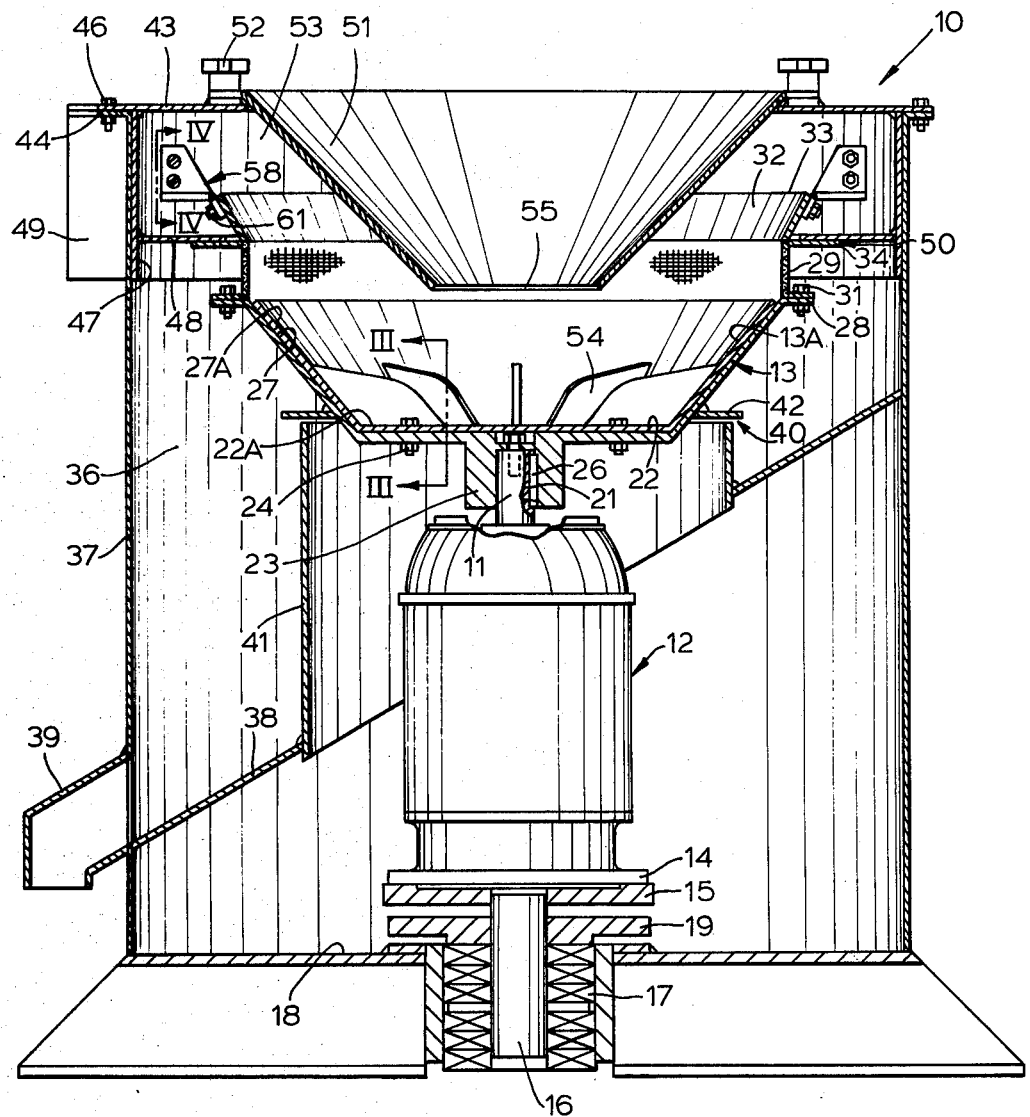
FIG. 2 is a sectional view taken along the line II—II of FIG. 1.

A second set of blades 58 is secured to the conical portion 32 adjacent the upper terminal edge 33 thereof. In the embodiment illustrated in FIGS. 2 and 4, the blades 58 include a base 59 secured by any convenient means such as flathead screws 61 to the conical portion 32 with the heads thereof countersunk into the conical surface 32. One can also use stud bolts 61 so that no head at all will appear on the inner surface of the cone 32 to interfere with the movement of chips flowing thereover. A wear plate 62 is secured to the base 59 by a plurality of fasteners 63.

Figure 5:
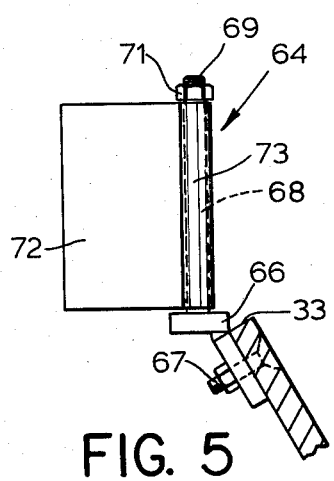
FIG. 5 is a fragmentary view of a modified blade structure mounted adjacent the upper edge of the centrifuge drum.

An alternate blade construction 64 is illustrated in FIG. 5. In the FIG. 5 construction, a bracket 66 is secured to the conical portion 32 adjacent the terminal edge 33 thereof by a plurality of flathead screws 67. The bracket 66 has a vertically extending pin 68 mounted thereon, the axis of which pin is parallel to the axis of the shaft 11. It is preferable to provide an external thread 69 adjacent the upper edge of the pin 68 to facilitate the receipt of an internally threaded nut 71 thereon. A blade 72 having a hollow sleeve portion 73 secured thereto, which sleeve 73 has an opening sufficient to receive the outer diameter of the pin 68 therein, is mounted on the pin. The nut 71 will prevent the inadvertent removal of the blade 72 from the pin 68. In addition, the blade 72 will be free to pivot about the axis defined by the pin 68. It has been discovered that no wear plates are needed in this particular embodiment. If excessive wear does in fact occur, all that needs to be done is to remove the nut 71 and simply slide the worn out blade 72 off from the pin 68 and replace same with a new blade 72.

OPERATION

Although the operation of the device embodying the invention has been indicated somewhat above, the operation will be described in detail hereinbelow for convenience purposes and to facilitate a more complete understanding of the invention.

As metal shavings impregnated with lubrication enter the cone 51 and the drum 13 through the lower conical opening 55, the lubrication-impregnated shavings will fall between the blade structure 54 and a rotation of the drum 13 will impart a rotational movement of the shavings. The shavings, as they gain rotational velocity, will begin to slide radially outwardly and up the conical surface 27 toward the porous cylindrical drum portion 29. As the shavings slide across the porous drum portion 29, lubrication contained on the shavings will be thrown radially outwardly through the holes therein and be collected in the chamber 36 for discharge through the outlet conduit 39. The chips will continue to move upwardly and radially outwardly on the conical surface 32 and be thrown radially outwardly and tangentially from the terminal edges 33 at the upper edge of the drum 13. The blades 58 will effect an air movement within the chamber 53 and the shavings entering the chamber 53 will be entrained in the aforesaid air movement. Air will be drawn into the chamber 53 through the material inlet opening 55 in the cone 51.

The air will be blown out through the outlet duct 49 and the shavings will be carried in entrainment therewith out through the outlet duct 49 toward any designated destination or by means of simple diverters to any one of several locations. As a result, our invention facilitates the movement of shavings to locations remote from the centrifuge by utilizing the energy imparted to the drum to effect a high velocity rotation thereof and without requiring any additional energy consuming mechanisms.

It is to be recognized that the mounting of air moving blades on the centrifugal drum can be utilized not only in drum constructions which open upwardly but also in drum constructions which open downwardly, such as the drum construction illustrated in Dudley Patent No. 3,850,814 or a horizontally opening drum. Accordingly, this invention is not to be limited specifically to the structure illustrated in the drawings, namely a structure utilizing an upwardly opening drum.

If excessive wear occurs to the liner 13A, it can be easily replaced by removing the bolt fasteners 24 to release the connection of the liner 13A to the drum 13. A new liner can be quickly inserted at a minimum of expense and down time.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A centrifuge for continuously separating a lubricating liquid from lubrication-impregnated metal shavings or the like, comprising:
   a motor having a rotatable drive shaft;
   inlet means;
   substantially bell-shaped centrifugal drum means having a shaving dispensing edge and openings for the discharge of the liquid therethrough;
   power transmission means for transmitting rotatable output from said drive shaft to said drum;
   collecting chamber means for collecting the liquid emanating from said lubrication-impregnated shavings and for discharging the liquid from said centrifuge;
   shaving collecting chamber means including an annular surface surrounding said shaving dispensing edge of said drum radially outwardly spaced therefrom for collecting shavings discharged by centrifugal action from said drum;
   an outlet duct means connected to said shaving collecting chamber means and having a central axis extending tangential of said shaving collecting chamber means and away therefrom;
   whereby said shaving collecting chamber means will collect said shavings emanating from said dispensing edge and the kinetic energy of said moving shavings will effect a movement thereof along said annular surface and into said outlet duct means for discharge thereof; and
   blower blade means secured to said drum and movable therewith for effecting a movement of air into said shaving collecting chamber means through said inlet means and out through said outlet duct means to effect an entrainmemt of said shavings in said air movement for discharge out through said outlet duct means, said blower blade means including a plurality of blades circumferentially spaced around the periphery of said drum means adjacent said shaving dispensing edge thereof, said shavings moving during said entrainment between said blower blades, each of said blades including support means supporting said blades for movement relative to said drum means.

2. A centrifuge according to claim 1, wherein said support means includes pivot means for pivotally supporting said blades for pivotal movement relative to said drum means.

3. A centrifuge according to claim 2, wherein said pivot means includes one of a pin and a bearing sleeve mounted on said drum means and extending parallel to the axis of said drive shaft and the other of said pin and said bearing sleeve mounted on each of said blades, said bearing sleeve and pin being mounted in sleeved relation.

4. A centrifuge according to claim 1, wherein said blades each have a removable wear plate secured thereto to facilitate easy replacement with a new wear plate.

5. A centrifuge according to claim 1, including wear resistant liner means received in said drum means and connecting means for releasably connecting said liner means thereto for rotation therewith; and
   whereby said liner means is easily replaced by releasing said connecting means, removing a worn liner means and insertion of a new liner means, followed by a connecting of said connecting means.

6. A centrifuge according to claim 5 wherein said liner means has a plurality of blade means fixedly mounted thereon.

7. A centrifuge according to claim 1, wherein said collecting chamber means for collecting liquid includes a bottom wall having a sufficient inclination to facilitate the gravitational movement of said liquid and resulting discharge of liquid from said centrifuge.

* * * * *